United States Patent [19]
Henson et al.

[11] Patent Number: 5,420,958
[45] Date of Patent: May 30, 1995

[54] OPTICAL FIBER DISTRIBUTION CENTER

[75] Inventors: Gordon D. Henson, Lake Elmo; Michael A. Meis, Maplewood; Anthony J. Piekarczyk, Fridley, all of Minn.

[73] Assignee: Minnesota Mining and Manufacturing Company, Saint Paul, Minn.

[21] Appl. No.: 276,211

[22] Filed: Jul. 15, 1994

Related U.S. Application Data

[63] Continuation of Ser. No. 945,450, Sep. 14, 1992, abandoned, which is a continuation of Ser. No. 759,042, Sep. 5, 1991, abandoned, which is a continuation of Ser. No. 526,586, May 21, 1990, abandoned.

[51] Int. Cl.⁶ .............................................. G02B 6/36
[52] U.S. Cl. ................................................... 385/135
[58] Field of Search ........................... 350/96.2, 96.21; 385/135, 70, 71, 72, 83, 84

[56] References Cited

U.S. PATENT DOCUMENTS

| | | | |
|---|---|---|---|
| 4,770,357 | 9/1988 | Sander et al. | 242/54 R |
| 4,818,054 | 4/1989 | George et al. | 350/96.2 |
| 4,824,196 | 4/1989 | Bylander | 350/96.20 |
| 4,948,220 | 8/1990 | Violo et al. | 350/96.2 |
| 5,289,558 | 2/1994 | Teichler et al. | 385/135 |

FOREIGN PATENT DOCUMENTS

| | | | |
|---|---|---|---|
| 0215668A3 | 3/1987 | European Pat. Off. | G02B 6/44 |
| 0247988 | 12/1987 | European Pat. Off. | 385/135 |
| 0329935 | 8/1989 | European Pat. Off. | G02B 6/44 |
| 341027A | 11/1989 | European Pat. Off. . | |
| 0341027A3 | 11/1989 | European Pat. Off. | G02B 6/44 |
| 0348278A1 | 12/1989 | European Pat. Off. | G02B 6/44 |
| 3528246A1 | 2/1987 | Germany | H02B 1/20 |
| 58-117513 | 7/1983 | Japan | 350/96.2 |
| 58-221818 | 12/1983 | Japan | 350/96.2 |
| 2165661 | 4/1986 | United Kingdom | G02B 6/36 |

OTHER PUBLICATIONS

Product literature entitled "ADC Telecommunications, Fiber Distribution Products," ADC Telecommunications, Inc. Minneapolis, Minn., Mar. 1987.
Catalog entitled "AMP, Optimate Single-Mode Fiber Optic Interconnection System," Catalog 86-792, May, 1987, pp. 22 and 23.
Product literature entitled "Anixter Stocks SIECOR Fiber Products", Anixter Bros, Inc., Skokie, Ill., 1987.
Magazine article entitled "New Products," paragraph entitled Rack System, in *Fiberoptic Products News*, (Feb. 1990) regarding COFO line of cross connect enclosures by Reliable Electric, Franklin Park, Ill.
Product literature entitled "Siecor, Premises Products and Services Overview, Fiber Optic Components of Universal Transport System," Siecor Corporation, Hickory, N.C., 1987.

*Primary Examiner*—Rodney B. Bovernick
*Assistant Examiner*—John Ngo
*Attorney, Agent, or Firm*—Gary L. Griswold; Walter N. Kirn; Stephen W. Buckingham

[57] ABSTRACT

A compact optical fiber distribution center has a housing provided by a pair of stackable containers. One container encloses a fiber connector zone in which a plurality of card-like modules are slidably mounted, normally aligned in single file, and each extending vertically when the distribution center is in use. The other container has a jumper routing zone at the front, a fiber routing zone at the rear, and an intermediate fiber storage zone which is divided by partitions, each of which is aligned with a space between adjacent modules. Each module carries a row of optical fiber connectors. At one side of the housing, the rear ends of the connectors can be connected to optical fibers of one or more feeder cables, and at the other side, the rear ends can be connected to optical fibers of one or more distribution cables. The front ends of the connectors at said one side can be connected by optical fiber jumpers to the front ends of connectors at said other side, thus interconnecting any feeder fiber with any distribution fiber. Easy access to the connectors is afforded by sliding individual modules out of the single file toward a front or a rear opening in the housing, which openings are closable by hinged doors.

17 Claims, 2 Drawing Sheets

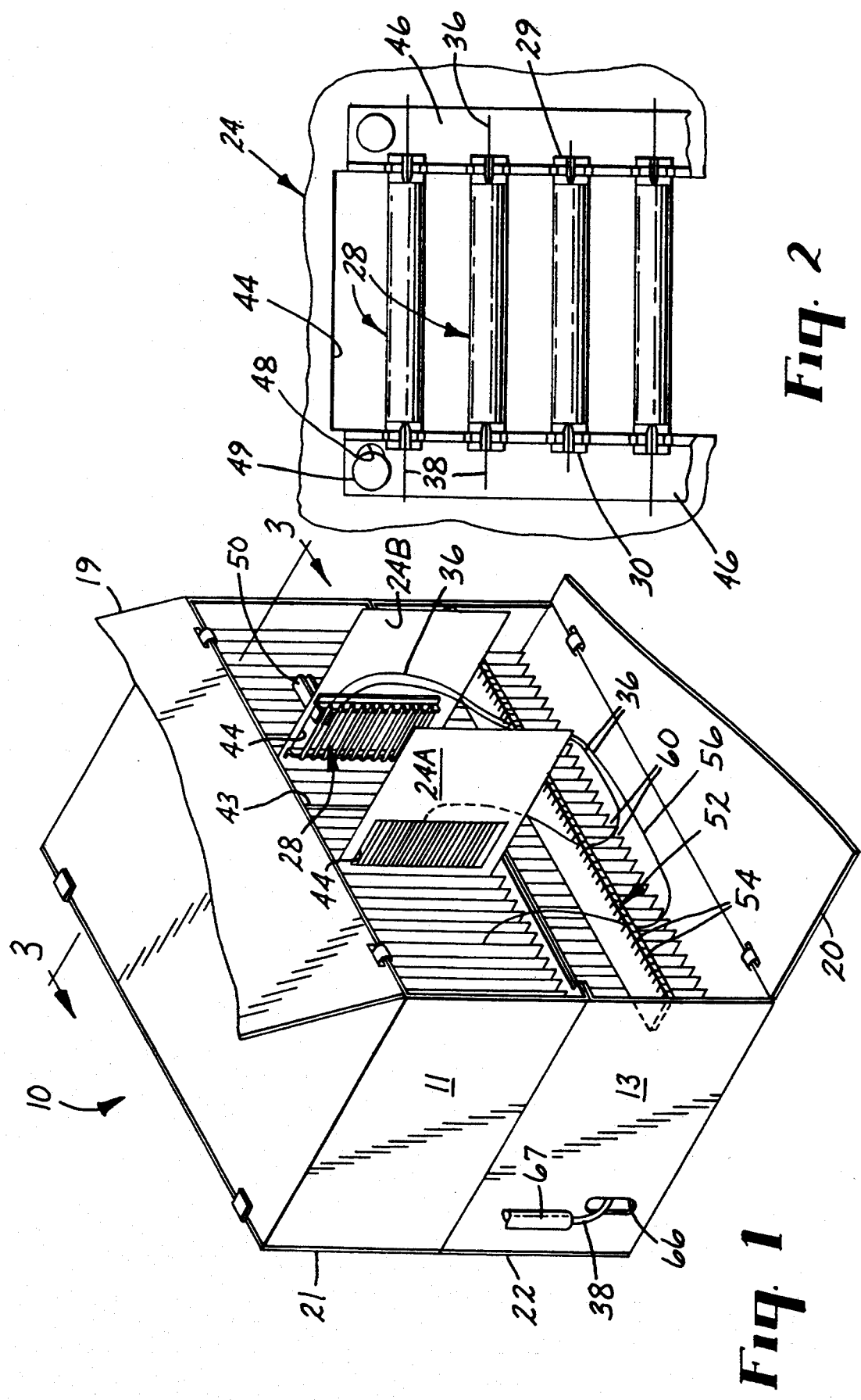

OPTICAL FIBER DISTRIBUTION CENTER

This is a continuation of application Ser. No. 07/945,450 filed Sep. 14, 1992, now abandoned, which is a continuation of application Ser. No. 07/759,042 filed Sep. 5, 1991, now abandoned, which is a continuation of application Ser. No. 07/526,586 filed May 21, 1990, now abandoned.

BACKGROUND OF THE INVENTION

1 Field of the Invention

The invention concerns a system for interconnecting large numbers of optical fibers at a distribution center. For example, the optical fibers of one or more feeder cables can be connected to individual optical fibers of a local network such as a telecommunication network.

2. Description of the Related Art

Optical fiber distribution centers now on the market typically have a cabinet or housing containing one or more panels or modules, each supporting a plurality of optical fiber connectors in columns and rows. See, for example, Northern Telecom NT6F26 fiber patch panel assembly, a panel of which pivots out of a housing to enhance access to individual connectors. See also the COFO fiber optic enclosures of Reliable Electric, Franklin Park, IL; the 24-fiber optical patch panel CPC of Siecor Corp., Hickory, N.C.; and the distribution centers illustrated in Catalog 86-792 dated 5-87 and entitled "Optimate Single-Mode Fiber Optic Interconnection System" from AMP Inc., Harrisburg, Pa., pages 22 and 23.

In order to improve access to individual connectors, the optical fiber distribution center of U.S. Pat. No. 4,824,196 (Bylander) mounts connectors in a single row along one edge of each of a plurality of modules, each of which can be pivoted out of a housing to afford access to its connectors, and then returned to the protection of the housing. Each connector is mounted at an angle such that it can be reached with minimal impediment from optical fibers of adjacent connectors.

Another optical fiber distribution center that employs modules (called "splice trays") that pivot out of a housing is shown in a brochure dated 1987 and entitled "Fiber Distribution Products" from ADC Telecommunications, Minneapolis, Minn.

Most optical fiber distribution centers now on the market interconnect up to 24 fiber pairs within a single housing. To interconnect larger numbers of pairs, housings can be stacked, and connections between fibers of different housings are made using jumper cables which must be long enough to extend between the housings. Nine 24-connector housings would be required to accommodate one 204-fiber cable from AT&T. An attempt to interconnect 204 incoming optical fibers to a distribution network by means of nine stacked housings of the prior art would create a confusing congestion of jumpers that would make it difficult to disconnect a jumper from a module of one housing and reconnect it to a module of a different housing.

Another optical fiber distribution center is described in EPO Patent Application EP 341,027A published Nov. 8, 1989.

In each of the aforementioned optical fiber distribution centers, each jumper is a cable fitted with connectors.

SUMMARY OF THE INVENTION

The invention provides an optical fiber distribution center that is believed to be the first to permit easy connection and reconnection between large numbers of optical fibers without confusing congestion. The novel distribution center can be made to occupy about one-fifth of the space required by prior distribution centers and at significantly reduced cost.

Briefly, the optical fiber distribution center of the invention comprises:
- a housing enclosing a fiber connector zone and a fiber storage zone, which housing is formed with a front opening at the fiber connector zone and at least one fiber exit,
- a plurality of modules,
- means for mounting the modules in the housing within said fiber connector zone and for moving each module individually toward (and preferably through) said front opening,
- a plurality of optical fiber connectors mounted on each module, each connector having front and rear ends,
- means for feeding an optical fiber jumper between the front end of each connector in a slack loop to the front end of another connector, and
- means for feeding an optical fiber from the rear end of each connector in a slack loop through the fiber storage zone and to a fiber exit.

The optical fiber jumper preferably is a buffered fiber, not fitted with connectors but prepared and cleaved on each end to permit it to be mechanically optically connected between the front ends of two of the connectors. Preferred mechanical optical connectors are disclosed and claimed in U.S. Pat. No. 4,470,180 (Blomgren).

In a preferred optical fiber distribution center of the invention, said housing is made up of a pair of stackable rectangular boxes or containers of equal size, one including said fiber connector zone and the other, said fiber storage zone. By stacking a plurality of such pairs in a rack, a large number of optical fiber connections can be made within a small space.

The modules preferably are card-like and extend vertically, and the connectors of each are in a vertical row on one side of the module. The fiber storage zone can be subdivided by fixed partitions, each approximately aligned with one of the spaces between adjacent card-like modules. A group of optical fibers at the rear ends of the connectors of each module can be fed into a flexible routing tube from which they emerge between two adjacent partitions of the fiber storage zone, and each fiber forms a slack loop before emerging from the housing at a fiber exit. The partitions keep the slack loops of the fiber groups separated, thus avoiding entanglement.

Preferably, there is a fiber routing zone behind the fiber storage zone, and an elongated, slotted fiber retainer extends across the fiber routing zone close to the fiber storage zone. Each slot can releasably secure the group of fibers from one module, and the fibers can fan out from the slot to one of the fiber exits. At a fiber exit, the optical fibers can be protected by one or more multiple-fiber feeder or distribution cables.

To facilitate connecting individual optical fibers to the rear ends of the connectors, the housing preferably can be opened at the rear of the fiber connector zone, and the means for mounting and moving the modules permits the modules to be moved individually through the rear opening for easy access to the rear ends of the connectors. The housing should also have a closable opening at the rear of the fiber routing zone for easy access to the fiber routing zone and its slotted fiber retainer.

After all of the optical fibers of the feeder and distribution cables have been connected to the rear ends of the connectors, the rear openings in the housing can be closed, and interconnections and changes in interconnections are made via optical fiber jumpers. To do so, a module at one side of the housing is moved through the front opening to afford easy access to its connectors, and a jumper is connected between the front end of one of its connectors and the front end of a selected connector of a selected module at the other side of the housing. This procedure is repeated until all of the desired jumper connections have been made.

The housing can be subdivided to provide, at the front of the fiber storage zone, a separate jumper routing zone at which is mounted a slotted jumper retainer. Each slot can releasably secure the jumpers of one module in a group. The length of each jumper should be selected to create a slack loop through the jumper routing zone between the two slots at which it is secured. The front of the jumper routing zone should be openable for easy access to the jumper retainer.

Because a typical buffered optical fiber has a small diameter (e.g., 0.2 to 0.3 mm), an array can easily become tangled, and when tangled, hard to separate. Hence, the buffered optical fiber jumpers preferably are of substantially larger diameter, e.g., from 0.75 to 1.5 mm, which also makes it easier to handle them and to trace one end from the other.

BRIEF DESCRIPTION OF THE DRAWING

In the drawing, all figures of which are schematic:

FIG. 1 is a perspective view of an optical fiber distribution center of the invention with two of its modules moved through a front opening of its housing and with a tool in place to permit an optical fiber jumper to be connected to one of the connectors mounted on that module:

FIG. 2 is an enlarged fragment of one of the modules seen in FIG. 1;

DESCRIPTION OF THE PREFERRED EMBODIMENT

Figure 3:
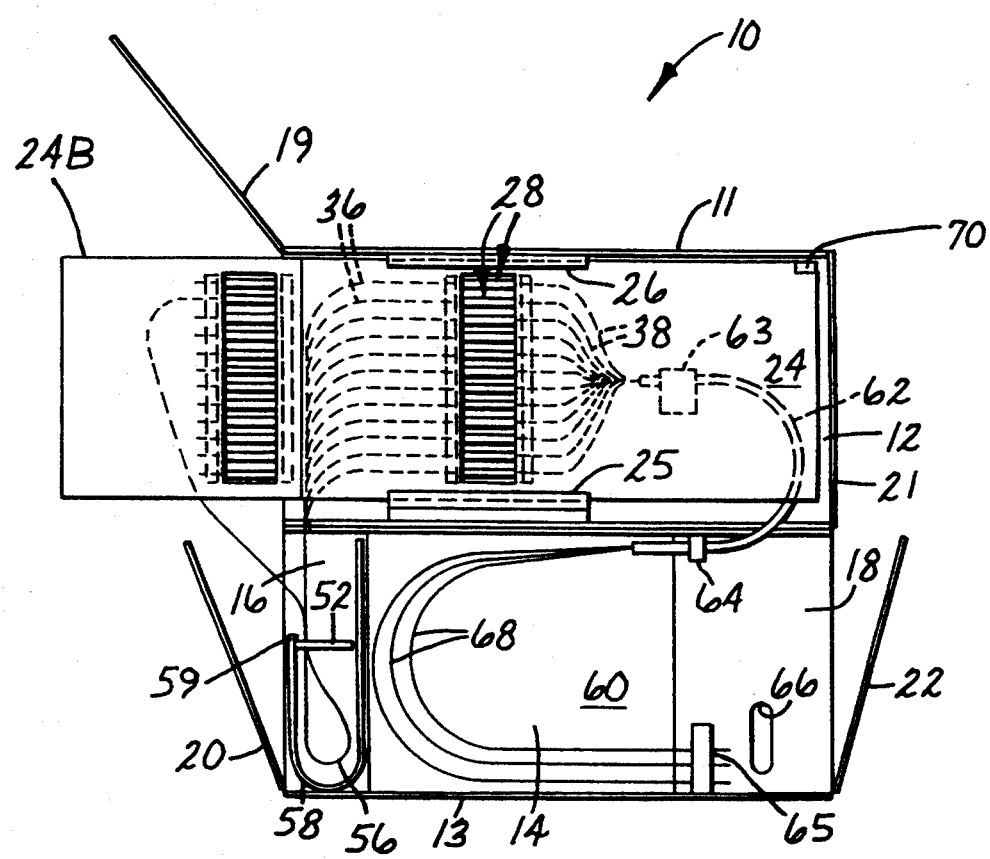
FIG. 3 is a cross section through the distribution center along line 3—3 of FIG. 1.
Figure 5:
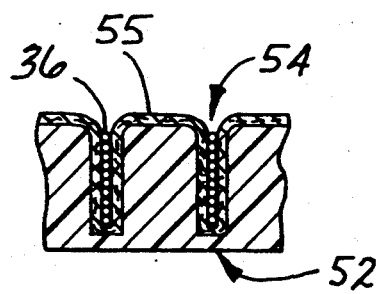
FIG. 5 is an enlarged fragment of the slotted jumper retainer shown in FIGS. 1 and 3.

The optical fiber distribution center 10 of FIGS. 1-5 has two rectangular containers of equal size. Of these, a connector container 11 encloses a fiber connector zone 12, and a storage container 13 encloses a fiber storage zone 14, a jumper routing zone 16 at the front, and a fiber routing zone 18 at the rear of the housing. Openings extending across the front of the connector and storage containers 11 and 13 can be closed by hinged doors 19 and 20, respectively, and rear openings can be closed by hinged doors 21 and 22, respectively. The doors 20 and 22 of the storage container preferably can be locked horizontally (means not shown) to permit their use as temporary shelves.

A plurality of card-like modules 24 are mounted in the connector container between slides 25 and 26 and normally are aligned in single file. Two of the modules 24A and 24B have been slid in FIG. 1 out of single file through the opening at the front door 19, thus affording easy access to the front ends 29 of a row of optical fiber connectors 28 that are shown in greater detail in FIG. 2.

Figure 4:
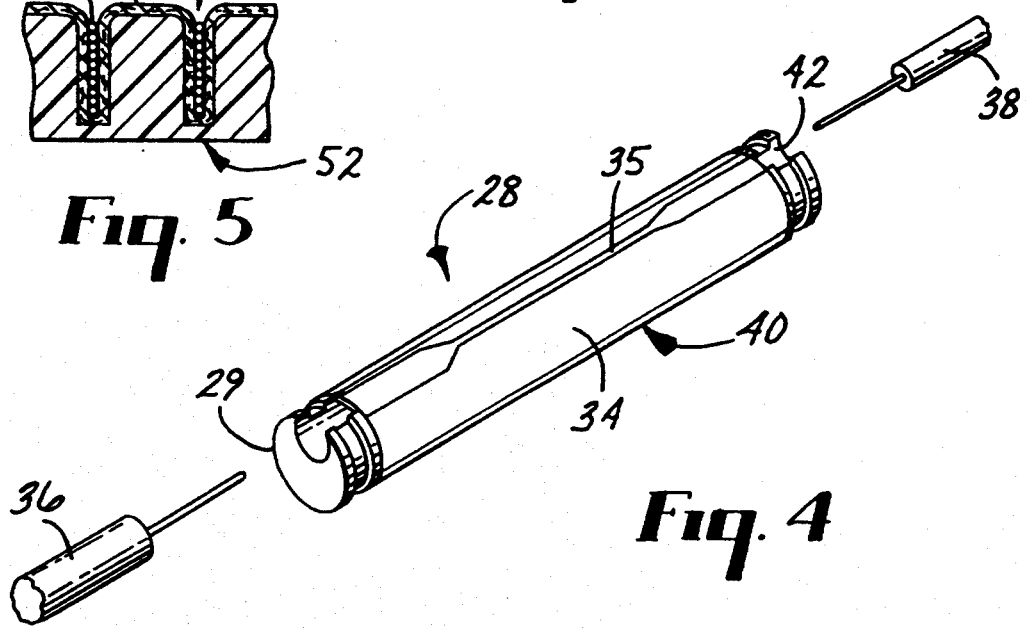
FIG. 4 is a perspective view of a mechanical optical fiber connector of the distribution center.

As shown in FIG. 4, each connector 28 has an elongated mount consisting of a ceramic block 34 of substantially uniform cross section that approximates an ellipse, and its surface is formed with a straight longitudinal V-groove 35 extending the full length of the block at the major axis of the ellipse. The longitudinal groove has a uniformly shallow central portion in which the bare ends of a pair of buffered optical fibers 36 and 38 can nest and uniformly deeper outer portions in which their buffers can nest such that the outermost surfaces of both the nested bare ends and the buffers lie in a substantially straight line.

Surrounding the ceramic block 34 and of approximately the same length is a deformable housing 40 which is substantially cylindrical when not deformed. When the housing 40 is squeezed to Contact the block 34 at the minor axis of its elliptical cross section, the optical fibers can be freely inserted or removed. At each of its extremities, the groove 35 opens into a bell mouth 42 to enhance threading optical fibers into the groove. After the optical fibers abut near the center of the connector, the deformable housing is released to return to its substantially cylindrical state to pinch each of the bare ends and the buffers against the longitudinal groove 35.

The optical fibers 36 that are connected to the front ends 29 of the connectors 28 are optical fiber jumpers, and the optical fibers 38 that are connected to the rear ends 30 of the connectors are feeder or distribution fibers. As viewed in FIG. 1, the lefthand modules 24 (including module 24A) receive feeder fibers, and the righthand modules (including module 24B) receive distribution fibers. A central blank card 43 separates the lefthand feeder modules from the righthand distribution modules.

As shown in FIG. 2, each module 24 is formed with a window 44 across which the connectors 28 extend. Each end of each connector is secured to a bracket 46, one of which has oval slots 48 at which it is attached to the module 24 by rivets 49 that allow the bracket to move sideways to accommodate possible dimensional changes in the connectors due to environmental changes.

As shown in FIG. 1, the window 44 permits a tool 50 to be applied from the back side of the module 24B, thus deforming the housing 40 of a connector 28 to permit an optical fiber to be inserted into the connector. In the forward position shown in FIG. 1, the optical fiber jumpers 36, can be connected to the front ends 29 of the connectors. Although the rear ends of the connectors could also be accessed through the front door 19, a module would be slid through the opening at the rear door 21 of the connector container 11 to connect a feeder or distribution fiber 38.

Extending across the jumper routing zone 16 at the front of the storage container 13 is an elongated jumper retainer 52 formed with a plurality of slots 54. Adhered to the slotted front face of the retainer (see FIG. 5) is a strip 55 of the loop of a hook-and-loop fastener such as is commercially available from American Velcro Inc. under the trademark "Velcro" or from 3M Co. under the trademark "Scotchmate." The spacing between portions of the loop strip 55 that cover the sides of each slot 54 is slightly less than the diameter of the buffer of a jumper 36, and all twelve jumpers from each module can be releasably retained at one slot.

The length of each jumper is selected to create a slack loop 56 between the two slots at which it is releasably secured. The slack loops of the jumpers are protected by a transparent flexible trough 58 (shown in FIG. 3 but not in FIG. 1) from being caught in the hinges of the door 20 or between the door 20 and the storage container 13. The trough is shaped from biaxially oriented poly(ethyleneterephthalate) film and partitions the storage container between the jumper routing zone 16 and the fiber storage zone 14. The trough can be retracted at a leading edge 59 by one's finger to afford access to the slotted jumper retainer 52.

FIG. 3 shows optical fibers 38 connected to the rear ends 30 of the connectors 28. In the fiber storage zone 14, a vertical partition 60 is aligned with each space between adjacent modules 24. Each group of optical fibers 38 that is connected at one module has been passed through a flexible routing tube 62, one end of which has been fastened by a clip 63 to a module 24 while the other end has been fastened immediately below the module to the roof of the storage container 13 by a clip 64.

Between the routing tube and a slot of a fiber retainer 65, the slack loops 68 of the optical fibers 38 are prevented by the partitions 60 from becoming entangled with groups of optical fibers emerging from other flexible routing tubes. The fiber retainer 65 can be like the slotted jumper retainer 52 but preferably is of less expensive construction, e.g., molded elastomeric foam. From the slot of the fiber retainer, the optical fibers 38 fan out in gentle curves to one of a pair of oval fiber exits, one in each side wall of the storage container 13.

To guard against macrobending, optical fibers extend from a distribution cable 67 (FIG. 1) through a fiber exit 66 in the lefthand wall of the storage container 13 to the righthand side of the slotted fiber retainer 65, while the feeder fibers cross the distribution fibers in the fiber routing zone 18 from the righthand fiber exit (not shown) to the lefthand side of the fiber retainer.

Before connecting a feeder or distribution fiber 38 to one of the connectors 28, it preferably is cleaved to a length such that there are slack loops 68 between each routing tube 62 and a slot of the fiber retainer 65. Considerable leeway is allowed in that length, because the loops initially gain slack when a module is slid through the front opening of the connector container, which added slack is lost when the module reaches the positions of modules 24A and 24B in FIG. 1. To prevent further forward movement of a module, a corner 70 at the rear of each module is bent and cannot enter the slide 26.

By stacking a plurality of pairs of the connectors 11 and 13 in a rack, any optical fiber of a network of a large number of feeder cables can be interconnected to any of a large number of distribution cables. To do so, each of the storage containers 13 should have appertures (not shown) in the sidewalls adjacent each end of the slotted jumper retainer 52 to allow a jumper to extend from an input module of one container to an output module of another container. If desired, the rack could be fitted with conduits to protect the jumpers from accidental contact.

These and other modifications will occur to those skilled in the art upon reading the foregoing specification and adapting it to their particular circumstances.

EXAMPLE

An optical fiber distribution center like that illustrated in FIGS. 1-5 has been constructed to have the following dimensions:

| each container 11 and 13 | |
|---|---|
| width | 43 cm |
| height | 18 cm |
| depth | 28 cm |
| fiber storage zone 14 | |
| depth | 16 cm |
| jumper routing zone 16 | |
| depth | 2.5 cm |
| fiber routing zone 18 | |
| depth | 9.5 cm |
| no. of modules 24 | 34 |
| no. of connectors per module | 12 |
| diameters of buffers of | |
| jumpers 36 | 0.9 mm |
| optical fibers 38 | 0.25 mm |
| flexible routing tube 62 | |
| inside diameter | 4.7 mm |
| length | 28 cm |
| fiber exits 66 | 2.5 × 7.6 cm |

The optical fiber distribution center of the Example proved to be much easier to use as compared to any distribution center that we have seen on the market. For example, by jiggling one end of an optical fiber jumper, the other end was readily located, thus making it surprisingly easy to replace or reposition that jumper. After sliding a pair of modules out of either the front or rear openings of the connector container, only the optical fibers associated with those modules were exposed. Any contact with other interconnected fibers was effectively prevented, because they were confined to the spaces between the modules.

Another important advantage is that each of the feeder and distribution fibers connected at one module can be cut to length without regard for the lengths of the other fibers. In doing so, it is only necessary to make sure to cut each fiber to a length that allows a slack loop in the fiber storage zone and a gentle fanout through the fiber routing zone.

By employing twelve connectors per module, it was found that there was no danger of tangling even though a very large number of interconnections could be made within a relatively small space. To accomplish this, it is believed that there should be from 4 to 24 connectors per module.

What is claimed is:

1. An optical fiber distribution center comprising:
   a housing enclosing a fiber connector zone and a fiber storage zone, which housing is formed with a front opening in the fiber connector and a rear opening in said fiber connector zone,
   a plurality of modules,
   means for mounting the modules in the housing within said fiber connector zone and for moving each module individually through said front opening and through said rear opening,
   a plurality of optical fiber connectors mounted on each module, each connector having front and rear ends, each front end being for receiving an optical fiber jumper that is also connected to another front end and each rear end being for receiving an optical fiber that runs through the fiber storage area and a fiber exit.

2. An optical fiber distribution center as defined in claim 1 wherein said housing comprises a pair of containers of equal size, one including said fiber connector zone and the other, said fiber storage zone.

3. An optical fiber distribution center as defined in claim 2 wherein the containers are rectangular and can be stacked in pairs.

4. An optical fiber distribution center as defined in claim 2 wherein the container that includes said fiber connector zone further includes means for slidably mounting the modules and a door for closing said front opening.

5. An optical fiber distribution center as defined in claim 1 wherein the modules are card-like and extend substantially vertically when the distribution center is in use.

6. An optical fiber distribution center as defined in claim 5 wherein the connectors of each module are in a vertical row on one side of the module.

7. An optical fiber distribution center as defined in claim 6 wherein the fiber storage zone is subdivided by fixed partitions, each approximately aligned with a space between adjacent card-like modules.

8. An optical fiber distribution center as defined in claim 7 and further comprising a plurality of flexible routing tubes and a group of optical fibers extending from the rear ends of the connectors of each module through one of the routing tubes and emerging in the fiber storage zone between two adjacent partitions.

9. An optical fiber distribution center as defined in claim 8 and further comprising a plurality of optical fiber jumpers, each connected between the front end of a connector of one module and the front end of a connector of another module.

10. An optical fiber distribution center as defined in claim 9 wherein the housing encloses a jumper routing zone at which is mounted a jumper retainer including means for separately retaining each group of jumpers connected to a module.

11. An optical fiber distribution center as defined in claim 10 wherein the jumper retainer is formed with a slot adjacent each module and means for releasably securing in each slot a plurality of optical fiber jumpers of said module in a group.

12. An optical fiber distribution center as defined in claim 11 wherein the length of each jumper is selected to create an easy slack loop through the jumper routing zone between two slots.

13. An optical fiber distribution center as defined in claim 12 wherein the housing is open at the front of the jumper routing zone for easy access to the jumper retainer, and contains a flexible trough for receiving said slack loops.

14. An optical fiber distribution center comprising:
a housing comprising a connector container and a stackable storage container, each container being formed with a front opening and a rear opening, the storage container having a pair of sidewalls, each formed with a fiber exit,
a plurality of card-like modules,
means for slidably mounting each module in the connector container to be normally aligned in single file and individually slidable through either of the front and rear openings of the connector container,
a row of connectors mounted on one side of each module, each connector having a front end adjacent said front opening and a rear end adjacent said rear opening of the connector container and including means for mechanically optically connecting an optical fiber to each rear end and an optical fiber jumper to each front end,
a fixed partition mounted in the storage container in approximate alignment with each space between adjacent card-like modules when the containers are stacked, the spaces between the partitions defining a fiber storage zone, there being a space between the partitions and the rear opening of the storage container to provide a fiber routing zone,
a flexible routing tube mounted to extend between each module and the space between adjacent partitions, which space is approximately aligned with the connectors of said module,
an elongated fiber retainer extending across the fiber routing zone close to the fiber storage zone, which retainer is formed with a plurality of slots, each slot including means for releasably securing a group of optical fibers from one flexible routing tube,
means partitioning the storage container to provide a jumper routing zone adjacent the front opening of the storage container, and
an elongated jumper retainer extending across the jumper routing zone, which retainer is formed with a plurality of slots, each including means for releasably securing a group of said optical fiber jumpers from one module.

15. An optical fiber distribution center as defined in claim 14 and further comprising a group of optical fibers extending from the rear ends of the connectors of each module through one of the routing tubes and in slack loops through the fiber storage zone between two adjacent partitions to a slot of said elongated fiber retainer, and fanning out in gentle curves to one of said fiber exits.

16. An optical fiber distribution center as defined in claim 14 and further comprising a plurality of optical fiber jumpers, each connected between the front end of a connector of one module and the front end of a connector of another module, all of the jumpers that are connected at one module being releasably secured in one slot of said jumper retainer.

17. An optical fiber distribution center as defined in claim 16 wherein each jumper is from 0.75 to 1.5 mm in diameter.

* * * * *